(12) United States Patent
Lui (10) Patent No.: US 10,624,314 B2
(45) Date of Patent: Apr. 21, 2020

(54) ANIMAL HARNESS WITH ATTACHABLE GARMENT

(71) Applicant: Patty Siu King Lui, Arcadia, CA (US)

(72) Inventor: Patty Siu King Lui, Arcadia, CA (US)

(*) Notice: Subject to any disclaimer, the term of this patent is extended or adjusted under 35 U.S.C. 154(b) by 413 days.

(21) Appl. No.: 15/339,644

(22) Filed: Oct. 31, 2016

(65) Prior Publication Data
US 2018/0116175 A1 May 3, 2018

(51) Int. Cl.
*A01K 13/00* (2006.01)
*A01K 27/00* (2006.01)

(52) U.S. Cl.
CPC .......... *A01K 13/006* (2013.01); *A01K 27/001* (2013.01); *A01K 27/002* (2013.01)

(58) Field of Classification Search
CPC .. A01K 13/006; A01K 27/001; A01K 27/002; A01K 27/008
USPC ........................................................ 119/850
See application file for complete search history.

(56) References Cited

U.S. PATENT DOCUMENTS

| | | | | |
|---|---|---|---|---|
| 1,612,945 A * | 1/1927 | Rieck | .................. | A01K 13/006 54/79.2 |
| 3,248,852 A * | 5/1966 | Schwartz | .............. | A01K 13/006 119/850 |
| 4,577,591 A * | 3/1986 | Wesseldine | ............ | A01K 23/00 119/850 |
| 5,467,743 A * | 11/1995 | Doose | .................. | A01K 27/001 119/858 |
| 5,632,235 A * | 5/1997 | Larsen | .................. | A01K 1/0263 119/856 |
| 5,970,921 A * | 10/1999 | Fulton | .................. | A01K 13/006 119/792 |
| 6,481,383 B1 * | 11/2002 | Ross | ..................... | A01K 13/006 119/850 |
| 7,370,608 B1 * | 5/2008 | Friedman | ............. | A01K 13/006 119/850 |
| 8,408,730 B2 * | 4/2013 | Hurwitz | ............... | A01K 13/003 362/108 |
| 8,424,495 B2 * | 4/2013 | Rivera-Brutto | .......... | A61D 9/00 119/850 |
| 8,807,090 B1 * | 8/2014 | Potts | ..................... | A01K 23/00 119/850 |
| 9,332,734 B1 | 5/2016 | Hege | | |

(Continued)

FOREIGN PATENT DOCUMENTS

WO WO-2017184653 A1 * 10/2017

OTHER PUBLICATIONS

The Uncommon Dog—internet website printout for Kong Dog Harness Coat; 2 pages; at least as early as Jun. 15, 2016.

(Continued)

*Primary Examiner* — Magdalena Topolski
*Assistant Examiner* — Morgan T Barlow
(74) *Attorney, Agent, or Firm* — John D. Carpenter (57) ABSTRACT

A combination animal harness and attachable garment includes a harness, a first set of one or more fasteners affixed to the harness, a cape or other garment, and a second set of one or more fasteners affixed to the cape, such that, when the cape is placed atop the harness, the garment is releasably attached to the garment by engaging the first set of fasteners with the second set of fasteners. An attachable headwear and collar, and combination collar, headwear, harness, and body wear are also provided.

9 Claims, 6 Drawing Sheets

(56) References Cited

U.S. PATENT DOCUMENTS

| | | | |
|---|---|---|---|
| 9,339,015 B2 | 5/2016 | Pinto | |
| 2005/0072376 A1* | 4/2005 | Kerrigan | A01K 13/006 119/850 |
| 2006/0090711 A1 | 5/2006 | Richards | |
| 2006/0278177 A1* | 12/2006 | Crawford | A01K 13/006 119/850 |
| 2007/0272170 A1 | 11/2007 | Milson et al. | |
| 2010/0043725 A1* | 2/2010 | Hall | A01K 13/006 119/850 |
| 2010/0269765 A1 | 10/2010 | Barghahn | |
| 2010/0313825 A1* | 12/2010 | Friedland | A01K 13/006 119/850 |
| 2011/0174237 A1* | 7/2011 | Sanders-Luckman | A01K 13/006 119/792 |
| 2011/0277703 A1* | 11/2011 | Yeaw | A01K 13/006 119/850 |
| 2011/0297107 A1* | 12/2011 | Kostelec | A01K 13/006 119/850 |
| 2013/0014705 A1* | 1/2013 | Cho | A01K 27/002 119/850 |
| 2013/0276719 A1 | 10/2013 | Ferrando | |
| 2014/0190424 A1* | 7/2014 | Howell | A01K 27/002 119/850 |
| 2014/0355256 A1* | 12/2014 | Curtis | A01K 13/006 362/108 |
| 2015/0245897 A1* | 9/2015 | Hasebi | A61D 9/00 119/850 |
| 2017/0156295 A1* | 6/2017 | Zoltanski | A01K 23/00 |

OTHER PUBLICATIONS

Baxter Boo—internet website printout for Kong Dog Harness Coat; http://www.BaxterBoo.com; 3 pages; at least as early as Jun. 15, 2016.

* cited by examiner

ANIMAL HARNESS WITH ATTACHABLE GARMENT

FIELD OF THE INVENTION

The invention relates to harnesses and outerwear for dogs, cats, and other animals.

BACKGROUND OF THE INVENTION

Dogs, cats, and other animals can be made more comfortable by outfitting the animal with a sweater, raincoat, hood, or other article of clothing before journeying outside. Sweaters are typically placed on the pet before a harness is attached, though examples of coat-harness combinations are known; see U.S. 2006/0090711A1 (Richards) and U.S. 2013/0276719 A1 (Ferrando). One drawback to such coat-harness combinations is that the coat is not easily removed without also removing the harness. Also, although pet owners are used to the "classic" harness, which has a neck loop, chest or body loop, chest strap, and back strap, newer harness models can be confusing. In addition, some pet owners prefer to leave the harness on their pet for extended periods, and are used to simply attaching the leash to a D-ring on the harness when it is time for a walk. It can be annoying to have to remove the harness, fit the sweater or other outerwear over the animal, and then reattach the harness.

A need exists for animal outerwear that can be readily attached to an animal harness or a simple collar, used in conjunction with a leash, and easily removed without removing the harness from the animal.

SUMMARY OF THE INVENTION

In a first aspect of the invention, a combination animal harness and attachable garment comprises a harness having a plurality of straps: a first set of fasteners affixed to the harness; a cape or other garment; and a second set of fasteners, affixed to the cape; such that, when the garment is placed atop the harness, the first and second sets of fasteners can be coupled to each other and thereby releasably attach the garment to the harness. The fastener(s) are affixed to the under surface of the cape at location(s) that facilitate quick and easy attachment/release to/from the harness, without having to remove the harness from the animal. In one embodiment, the harness is a classic animal harness with a neck loop, body loop, chest and back straps, and a D-ring affixed to one end of the back strap. A first set of one or more snap fasteners, Velcro® strips, magnetic fasteners, or other fasteners is affixed to one or more of the harness straps, preferably along the upper portion of the harness (e.g., neck loop upper straps, body loop upper straps, and/or the back strap). A corresponding second set of one or more fasteners is affixed to a cape or other garment, the cape's fasteners being arranged such that, when the cape is placed atop the harness, corresponding fasteners are aligned with and releasably coupled to each other. In this way, the cape can be releasably secured to the harness. When a pet owner desires to walk his or her dog, cat, or other animal, the harness is placed on the pet in a conventional way. If it is a chilly day, or if there is a risk of rain, the cape can be draped over the harness, and mating pairs of fastener halves on the cape and harness are coupled to one other. Alternatively, the pet owner may bring along the cape "just in case," and easily attach the cape to the harness when needed. Advantageously, the cape can be removed from the pet without removing the harness.

In a preferred embodiment, the fastener(s) on the cape are located in a central "dorsal" region behind the cape's proximal end (head end), generally equidistant from the left and right edges of the cape, such that they engage the harness near the animal's neck or upper back, and without need of fasteners to wrap the cape around the animal's body. This location facilitates quick and easy attachment/release to/from the harness. Even a single fastener here will suffice, though a plurality of fasteners is preferred. Magnetic fasteners are particularly preferred for their ease of attachment and release.

In a second aspect of the invention, a combination animal collar and attachable garment comprises a simple collar; a garment (e.g., headwear—apparel for the animal's head—and/or body wear—apparel for the animal's body); and or more fasteners affixed thereto, with at least one fastener being affixed to the collar and at least one counterpart fastener being affixed to the garment. The garment is releasably attached to the collar by engaging corresponding mating fasteners with one another.

In a third aspect of the invention, attachable head and body wear for an animal comprises a collar, headwear harness, cape or other garment, and a plurality of fasteners. At least one fastener is affixed to the collar or the harness, and at least one counterpart fastener is affixed to the headgear or garment. The headwear is releasably attachable to the collar, and the cape or other garment is releasably attachable to the harness.

BRIEF DESCRIPTION OF THE DRAWINGS

Various features and advantages of the invention will be understood more completely when considered in connection with the accompanying drawings (which are not necessarily drawn to scale; wherein:

FIG. 2 is a top plan view of a portion of the animal harness shown in FIG. 1, with some straps removed for clarity);

DETAILED DESCRIPTION

One embodiment of a first aspect of the invention—a combination animal harness and attachable garment—is depicted in FIGS. 1-5. The combination 10 includes a classic dog or cat harness 20, having a neck loop 30, body (chest) loop 40, chess strap 50, back strap 60, and D-ring 70; and an attachable cape 80 or similar garment (e.g., sweater, raincoat, etc.). The harness 20 is made of natural or synthetic fabric (e.g., nylon webbing), leather, or some other flexible yet durable material, with metal or plastic hardware—rings, buckles, etc. With the exception of various inventive features described herein, this type of harness is very familiar to most dog and cat owners. The cape 80 has any of a number of intrinsic properties and purposes, such as thermal insulation, water retardation, decoration, etc., and is constructed of a material or materials amenable to such purpose(s). Nonlimiting examples include natural and synthetic fabrics, mesh, composites, and the like.

Figure 1:
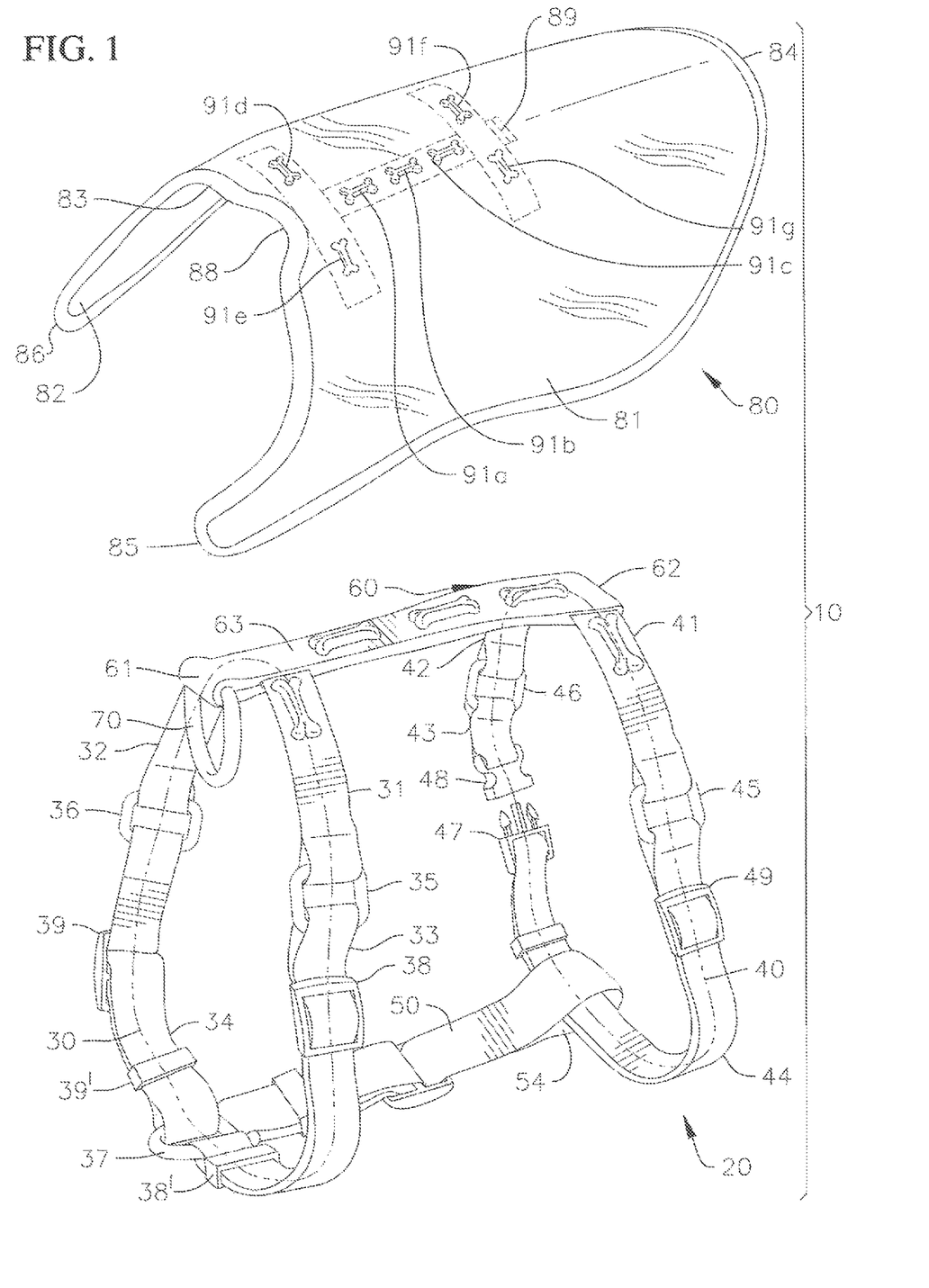
FIG. 1 is a perspective view of a combination animal harness and attachable cape according to one embodiment of the invention.

As shown in FIGS. 1 and 2, the neck loop 30 of the harness includes left and right upper straps 31, 32 (which may form a unitary piece), and left and right lower straps 33, 34. The neck loop upper straps 31, 32 extend from either side of the back strap 60, and left and right pairs of upper and lower straps meet at and are coupled to each other by a corresponding ring, 35, 36. The neck loop left and right lower straps 33, 34 are similarly coupled to each other—and to the chest strap 50—by a ring 37. 39 Slides 38, 39 permit the circumference of the neck loop to be adjusted to fit the neck of the animal.

Similarly, the body (chest) loop 40 includes left and right upper straps 41, 42 extending from either side of the back strap 60; a short side strap 43; and a long side strap 44. The left upper strap 41 and the long side strap 44 are coupled to each other by a ring 45, and the right upper strap 42 and short side strap 43 are coupled to each other by a ring 46. The long side strap 44 passes through a loop 54 formed in the chest strap 50. Male and female ends 47, 48 of a snap-fit buckle are secured to the long side strap 44 and short side strap 43, respectively, and permit the body loop 40 of the harness to be secured around the chest of the animal. A separate slide 49 permits the body loop to be fitted (size-adjusted) to the animal. The chest strap 50 is approximately twice as wide as the chest loop straps 41-44.

The harness back strap 60 has a front end 61, rear end 62, top surface 63, and lower surface 64, and is approximately twice as wide as the neck loop straps 31-34. A D-ring 70 for securing the harness to a leash or lead is affixed to the front end 61 of the back strap. In an alternate embodiment (not shown), the D-ring is affixed to the rear end 62 of the back strap.

Figures 2A, 2B:
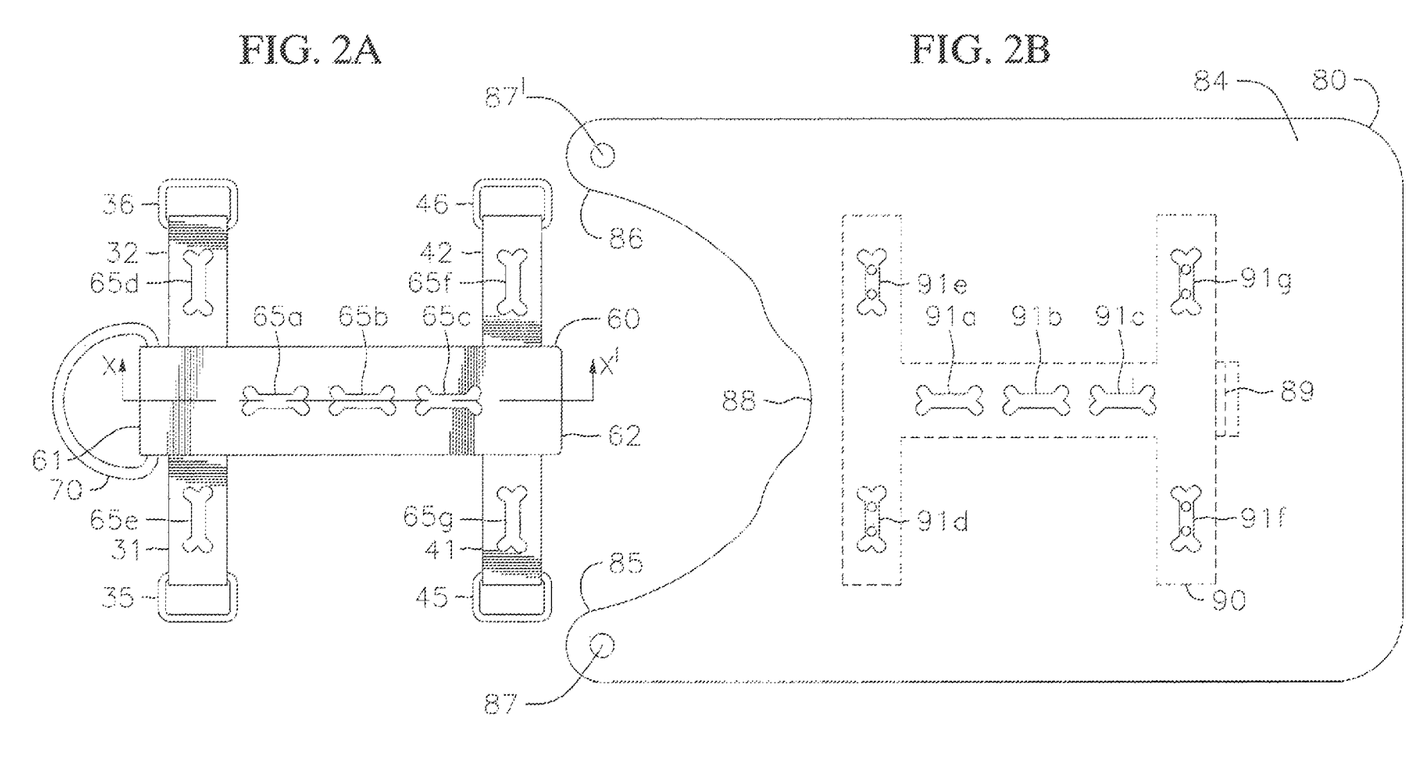
FIG. 2B is a bottom plan view of the cape shown in FIG. 1.

Referring to FIGS. 1 and 2*b*, the cape has a top (outer) surface 81, a bottom (under) surface 82, a head (proximal) end 83, and a tail (distal) end 84. Left and right panels 85, 86 extend from the main body of the cape at the head end. Decorative trim or stitching is secured to the perimeter of the cape.

In the middle of the proximal end of the cape, a slight concave arc 88 is formed. When the cape is placed over the harness, on the back of an animal, this concave arc is substantially adjacent to, but does not cover, the D-ring 70 of the harness. In this embodiment, the D-ring 70 of the harness is located at the front end 61 of the back strap 60. Alternatively, a small slit 89, large enough to accommodate the D-ring, is formed in middle of the cape. (In this alternate embodiment, the D-ring 70 of the harness is located at the rear end 62 of the back strap, and the D-ring protrudes through the slit 89 when the cape is placed over the harness.)

Importantly, a first set of one or more fasteners is affixed to the top (outer) surface of the harness, and a counterpart second set of one or more fasteners is affixed to the bottom (under) surface of the cape. In the embodiment shown in FIGS. 1 and 2, three fasteners 65*a*-65*c* are affixed to the top surface 63 of the back strap 60, and four fasteners 65*d*-65*g* are affixed to the top (outer) surface of the neck loop left and right upper straps 31, 32, and the body loop left and right upper straps 41, 42, respectively. A counterpart set of fasteners 91*a*-91*g* is affixed to the under surface 84 of the cape. Nonlimiting examples of suitable fasteners include snap fasteners (also known as press studs), hook and loop fasteners (e.g., Velcro® strips), magnets (e.g., alnico magnets, rare-earth magnets, etc.), zippers, and buttons/button holes. Magnetic fasteners are preferred, as they attach and release quickly and easily.

Each fastener affixed to the harness has a counterpart fastener affixed to the cape. For example, the male or female half of a snap fastener can be affixed to the harness with a rivet or stitching, and the opposite half—female or male—of a snap fastener can be affixed to the garment. As another example, the hook or loop portion of a Velcro® strip or patch can be affixed to the harness with stitching or adhesive, and the opposite portion—loop or hook—of a Velcro® strip or patch can be affixed to the garment. As a third example, one or more magnets are affixed to the harness (see below), and either another magnet or a ferrous metal or other magnetizable material is affixed to the cape. (Alternatively, the parts are reversed, with the magnet(s) being affixed to the undersurface of the cape. Pairs of magnets can also be employed.)

In each of these examples, one fastener is affixed to the harness and a counterpart fastener is affixed to the cape.

Figure 3:
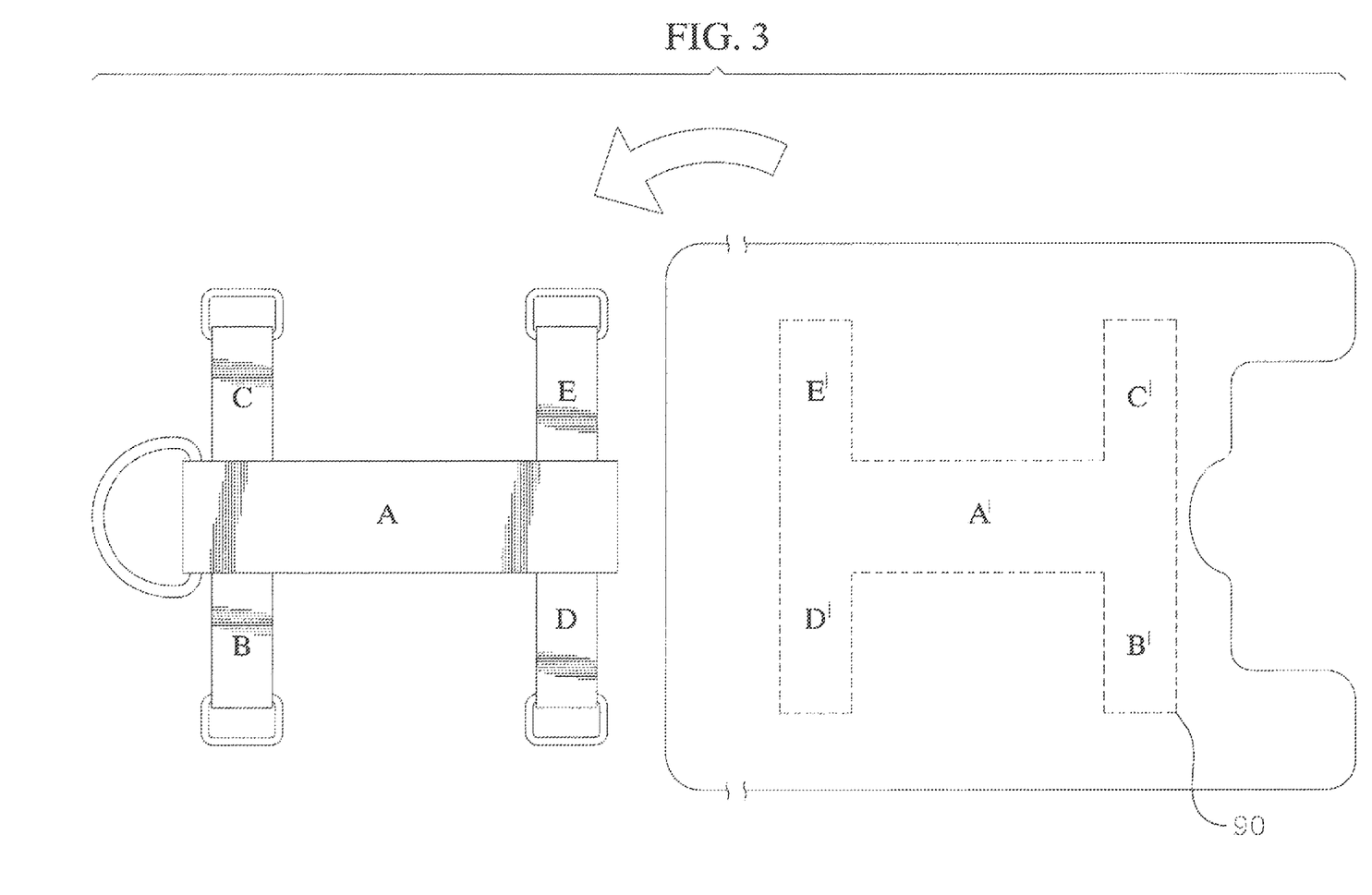
FIG. 3 is a schematic illustration of a harness and cape combination according to one embodiment of the invention, showing fastener placement locations.

It is preferred that the first and second sets of fasteners affixed to the harness and cape are located such that the cape can be attached to—and removed from—the harness quickly and easily, and without removing the harness from the animal. FIG. 3 schematically illustrates the top (outer) surface of a portion of the harness and the bottom (under) surface 84 of the cape. Complementary fasteners—snaps, magnets, Velcro strips or patches, etc.—are located at one or more pairs of locations; A,A', B,B', etc. on the harness and cape, respectively. For example the male half of one or more snap fasteners can be affixed to the top surface 63 of the back strap 60 of the harness at location A, and the corresponding female half of an equal number of snap fasteners can be affixed to the undersurface 82 of the cape at location A', within the "H"-shaped region 90 denoted by dashed lines in FIGS. 1, 2B, and 3. The region 90 is generally centrally located, with the "crossbar" of the "H" being substantially equidistant from the left and right side edges of the cape.

As a second example, one or more snap fasteners (male half) can be affixed to the top (outer) surface of the upper neck loop straps 31, 32 at locations B and C, respectively, and the corresponding female half of an equal number of snap fasteners can be affixed to the undersurface of the cape at locations B' and C', respectively, within the "H-shaped region 90. As a third example, snap fasteners (male and half) can be affixed to the top (outer) surface of the harness back strap at location A, the upper neck loop straps 31, 32 at locations B and C, respectively, and the body (chest) loop left and right upper straps 41, 42, at locations D and E, respectively; and the corresponding female half of an equal number of snap fasteners can be affixed to the undersurface of the cape at locations A'-E', respectively. Other permutations of harness/cape complementary locations for fastener placement are included within the scope of the invention, including without limitation A,A' only; B,B'+C,C'; A,A'+B, B'+C,C'; A,A'+D,D'+E,E'; B,B'+C,C'+D,D'+E,E; etc. The region 90 in FIGS. 1, 2B, and 3 is the "dorsal" region—the middle to upper portion of the animal's back.

In a preferred embodiment, either or both sets of fasteners 65*a*-65*g* and/or 91*a*-91*g* is magnetic, while the other set (91*a*-91*g* or 65*a*-65*g*) is either magnetic or at least magnetizable (i.e., composed of a ferrous metal or other magnetizable material). Hence, mating pairs of fasteners will magnetically couple to each other; 65a and 91a; 65b and 91b; 65c and 91c; etc. For aesthetic purposes, each fastener is shaped like a dog bone. Alternatively, the fasteners have some other shape, which may be plain (e.g., rectangle, square, circle, etc.) or fancy.

Figure 4:
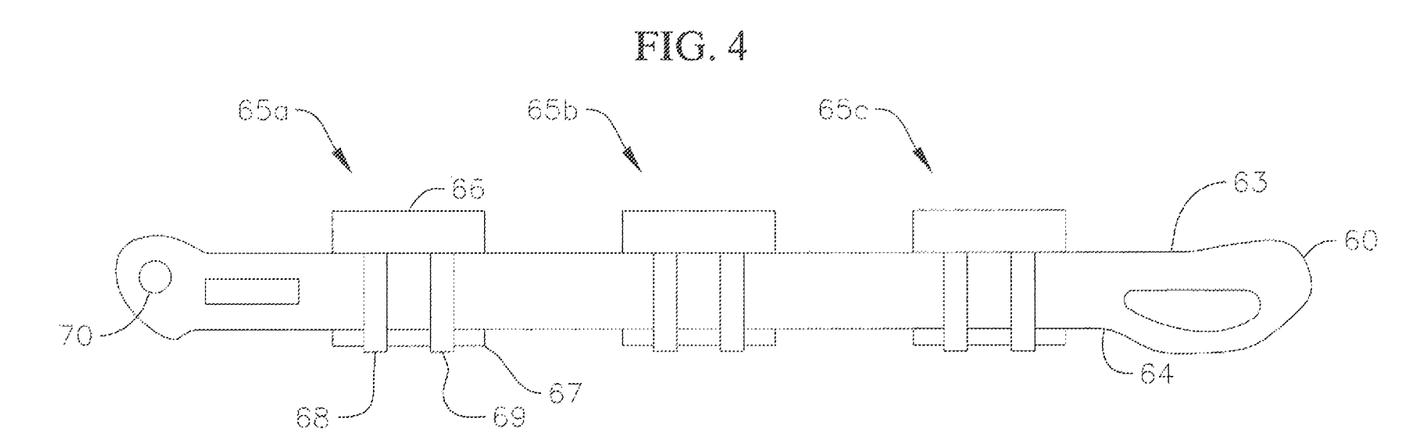
FIG. 4 is a side sectional view of a portion of the animal harness shown in FIG. 2A, taken along line X-X'.

As shown in FIG. 4, each fastener 65a-65g comprises a top piece 66, a bottom piece or mounting plate 67, and a pair of rivets 68, 69 that extends through the back strap and connects the top and bottom pieces together, thereby securing the fastener to the back strap. Similarly, each fastener 91a-91g comprises a top piece 92, a bottom piece or mounting plate 93, and a pair of rivets 68, 69 that extends through the cape and connects the top and bottom pieces together, thereby securing the fastener to the cape.

Figure 5:
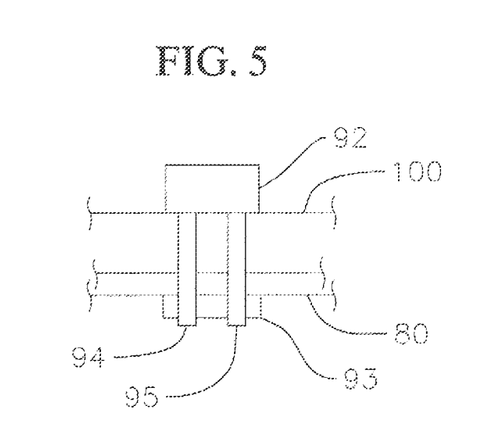
FIG. 5 is a side sectional view of a portion of a cape according to one embodiment of the invention.

In another embodiment, optional straps or webbing 100 is sewn to the top (outer) surface 82 of the cape, in the dorsal region. In FIG. 1, the location of such optional outer webbing is coincident with the "H"-shaped region 90 (though on the outer surface, rather than the undersurface, of the cape. The webbing is made of the same material of which the harness is formed, or of different material, with dimensions substantially similar to the dimensions of straps 31, 32, 41, 42, and 60 of the harness. The plurality of fasteners 91a-91g is affixed to both the webbing and the cape. A cross-sectional view of this embodiment is depicted in FIG. 5.

In another embodiment (not shown), the fasteners have a simple one-piece construction and are affixed to the top surface 63 of the back strap (or the under surface 84 of the cape) using glue, stitching, or other attachment means known in the art.

In still another embodiment of the invention, either or both sets of fasteners (e.g., 65a-65g and/or 91a-g) comprise pieces of magnetic tape, which can have a plain (e.g., rectangle, square, circle, etc.) or fancy shape (e.g., dog bone). One surface of the magnetic tape is adhesive and thereby provides a means for affixing the magnetic tape to the harness or the cape at the previously indicated locations.

In those embodiments in which magnetic fasteners are employed, either or both sets of fasteners—for example, 65a-65g on the harness and/or 91a-91g on the cape—are magnetized. Thus, in one embodiment, all of the fasteners 65a-65g on the outer surface of the harness are magnetic, whereas the fasteners 91a-91g on the cape are merely magnetizable (e.g., composed of a ferrous metal)—and as such will magnetically couple with the fasteners 65a-65g when the cape is draped over the harness. In another embodiment, the fasteners 91a-91g on the cape are magnetic, whereas the fasteners 65a-65g on the top surface of the harness are merely magnetizable (e.g., composed of a ferrous metal). In still another embodiment, both sets of fasteners 65a-65g and 91a-91g are magnetic, with their magnetic poles attractively aligned. In all such embodiments, mating pairs of fasteners on the harness and the cape can be magnetically coupled to one another: fastener 65a mates with and is magnetically coupled to fastener 91a, fastener 65b mates with and is magnetically coupled to fastener 91b, and so forth. Hence, the attachable cape can be readily but releasably secured to the harness.

It will be appreciated that more or fewer fasteners than are depicted in the drawings can be utilized while still realizing the benefits of the invention. In one preferred embodiment, at least one fastener is located on the neck loop 30, and at least one is located on the chest loop 40, and two counterpart fastener are correspondingly located on the cape, at the appropriate locations (i.e., within the central region denoted by a dashed "H" in FIGS. 1, 2B, and 3). In another preferred embodiment, the harness back strap 60 also includes at least one such fastener, with a counterpart fastener corresponding located on the cape.

In still another embodiment of the invention (not shown), a middle article of clothing (mid layer) is placed between the harness 20 and the cape 80 or other outerwear and secured in place with mating sets of fasteners located on the top surface of the harness, top and bottom surfaces of the mid layer, and under surface of the cape. The mid layer may also have a set of fasteners located on the mid layer's top and bottom surfaces, at locations that permit the mid layer's fasteners to line up with and couple to corresponding fasteners on the harness and/or cape.

In another embodiment (not shown), the cape 80 is the mid layer, and a separate outer garment—having a corresponding set of fasteners on at least a portion of its under surface—is provided and can be attached to the cape.

The inventive features described above are equally suitable for releasably securing a garment—headwear and/or body wear—to an animal collar. Accordingly, in a second aspect of the invention, a combination animal collar and garment is provided. The garment may cover a portion of the animal's head, and/or its body. Nonlimiting examples of such garments include headwear, e.g., hoods, cowls, simple hats, etc., and body wear, such as capes, coats, and sweaters.

Figure 6:
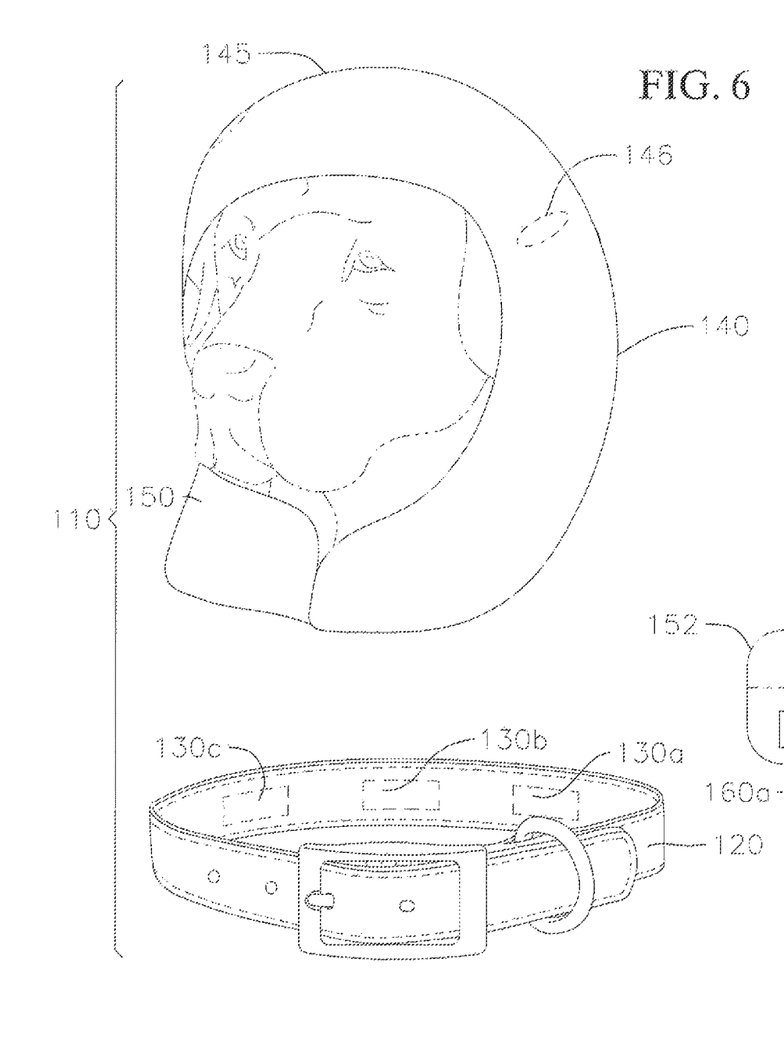
FIG. 6 is a perspective view of one embodiment of a combination animal collar and attachable hood according to the invention.
Figure 7:
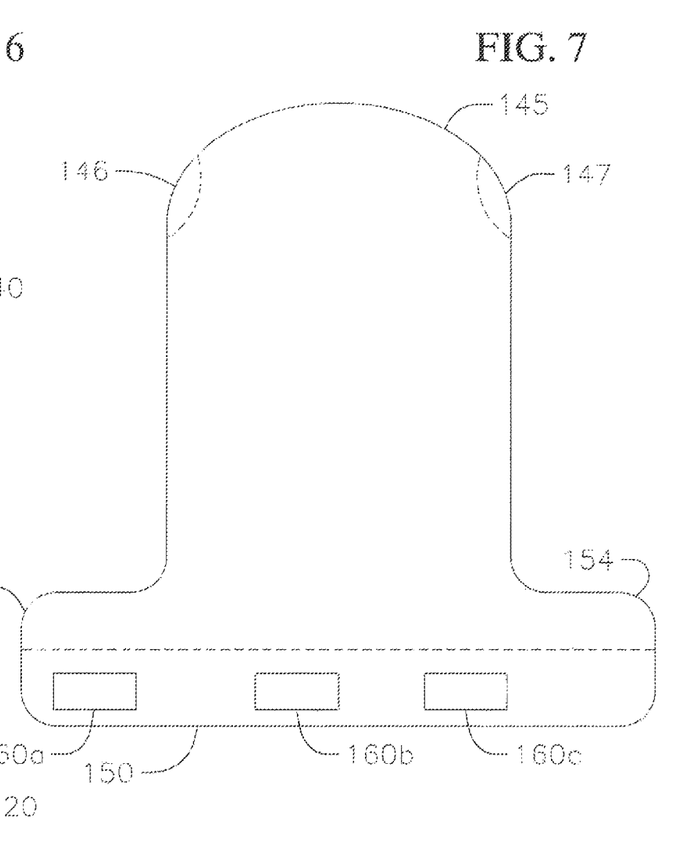
FIG. 7 is a back plan view of the hood shown in FIG. 6.

One embodiment of such a combination is shown in FIGS. 6 and 7. The combination 110 includes a collar 120, hood 140, and one or more fasteners 160. The collar comprises an adjustable loop strap of natural or synthetic fabric (e.g., nylon webbing), leather, or some other flexible yet durable material, with a metal or plastic buckle, snap, or other means for securing one end of the strap to the other once the loop has been placed around an animal's neck. This type of collar is commonly used to attach a leash and/or identification (e.g., "dog tags") to the animal. The hood 140 has any of a number of intrinsic properties and purposes, such as thermal insulation, water retardation, decoration, etc., and is constructed of a material or materials amenable to such purpose(s). The hood 140 includes a head portion 145 that covers the animal's head and ears—but not its eyes or face—and a neck portion 150 that includes left and right panels 152, 154 that can be joined together at the front, at or near the animal's throat. Optionally, openings 146, 147 are provided for the animal's ears.

One or more fasteners (e.g., snap fasteners, Velco® fasteners, magnets, etc.) are secured to the collar and the hood, in the manner previously described above with respect to the harness and outer garment. For example, in FIGS. 6 and 7, three fasteners 130a-130b are affixed to the outer surface of the collar and three counterpart fasteners 160a-160c are affixed to the under surface of the hood, at or near the neck region 150. As in the first aspect of the invention, pairs of magnetic fasteners can be employed, with at least one set of fasteners being magnetic, while the other set is either magnetic or at least magnetizable (i.e., composed of a ferrous metal or other magnetizable material.

Body wear can be releasably attached to the collar in a similar way. For example, a cape can be releasably attached to the collar by affixing one or more fasteners to the undersurface of the proximal end (head end) of the cape, with one or more counterpart fasteners being affixed to the outer surface of the collar.

Figure 8:
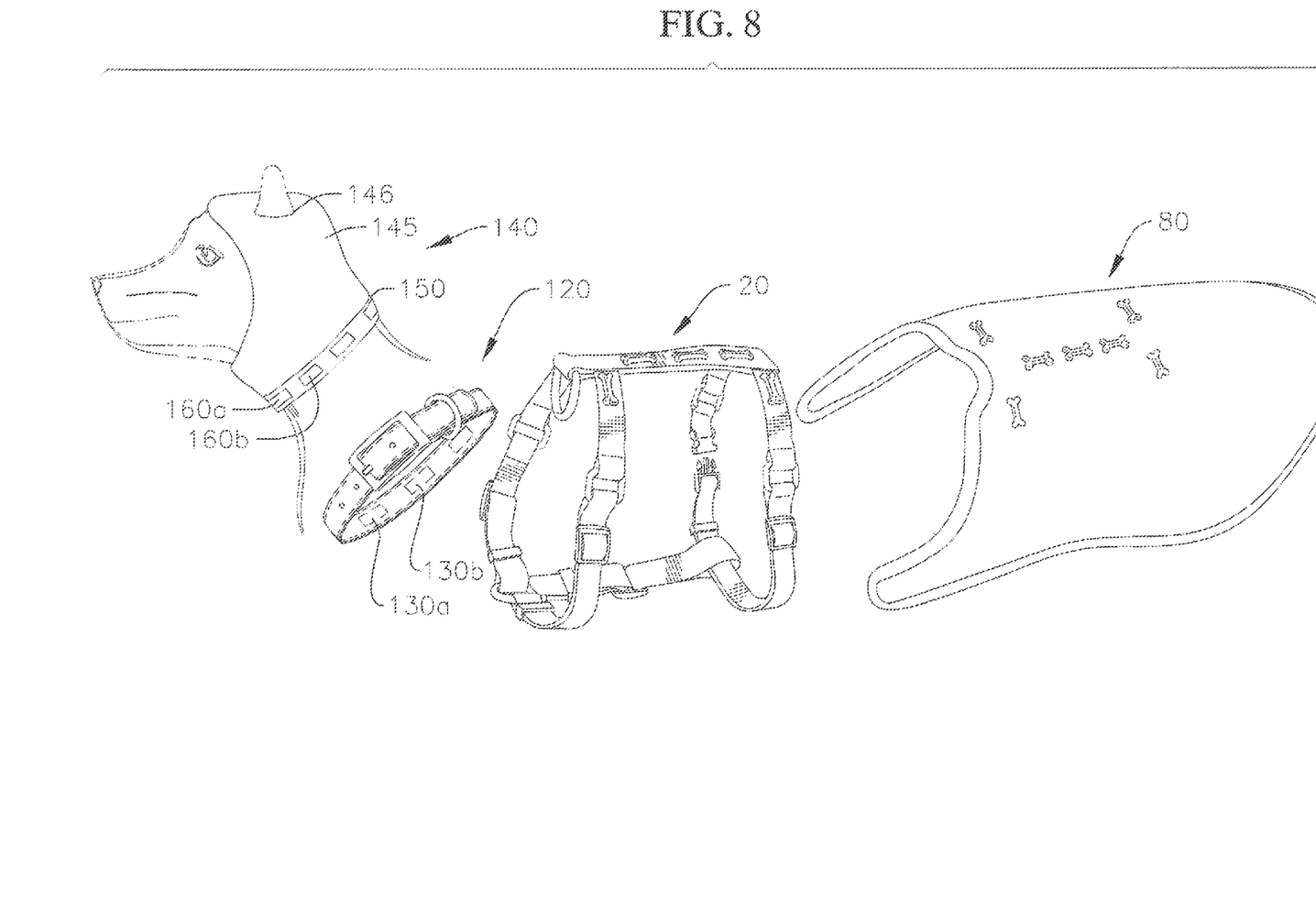
FIG. 8 is a schematic perspective view of one embodiment of a combination animal collar, attachable hood, animal harness, and attachable cape according to the invention.

In a third aspect of the invention, a combination animal collar, attachable headwear (e.g. hood, cowl, scarf, etc.), animal harness, and attachable body wear (e.g., cape, sweater, coat, etc.) is provided, with components corresponding to the components previously described. One embodiment of such a combination is shown in FIG. 8. The combination includes an animal harness 20, body wear (e.g., a cape or other garment 80, animal collar 120, and headwear 140. A first set of one or more fasteners (130a, 130b, etc.) is affixed to an outer surface of the collar. The head wear 140 has an inner (under) surface and an outer surface. A second set of one or more fasteners (160a, 160b, etc.) is affixed to a neck portion of the headwear. A third set of one or more fasteners (65a, 65b, etc.) is affixed to an outer (upper) surface of the animal harness 20. The body wear 80 has a top (outer) surface and a bottom (under) surface. A fourth set of one or more fasteners (91a, 91b, etc.) is affixed to the body wear's under surface, preferably within a dorsal region. The fastener(s) on the collar (130a, 130b, etc.) couple to the fastener(s) on the headwear (160a, 160b, etc.), while the fasteners(s) on the harness (65a, 65b, etc.) couple to the fastener(s) on the body garment (91a, 91b, etc.). An animal can be fitted with the collar and harness, with the attachable headwear and body wear carried by the animal's owner until needed. Alternatively, the animal can be outfitted with collar, headwear, harness, and body wear, and then the headwear and/or body wear can be removed, quickly and easily, when appropriate for the ambient weather conditions.

Upon reading this disclosure, other embodiments and modifications will be apparent to the skilled person. For example, the magnetic/magnetizable fasteners can be affixed to the garment(s), collar, and/or harness in a manner other than as described. Harnesses having leg loops, but no neck loop, can be utilized (in which case, the fasteners can be located on a back strap and/or upper part of one or both of the leg loops—with counterpart fasteners on the cape relocated so as to couple to the other fasteners. Optionally, a snap, button, Velcro® patch, magnet, or similar fastener is affixed to each panel at a forward location 87, 87' in the left and right panels, respectively (see FIG. 2b). These optional fasteners enable the panels 85, 86 of the garment to be coupled together and thereby secure the head end of the cape about the throat or chest of the animal. All such embodiments and modification fall within the scope of the present invention, which is limited only by the appended claims and equivalents thereof.

What is claimed is:

1. A combination animal harness and attachable garment, comprising:
    an animal harness having an outer surface that faces away from the animal, the harness comprising a neck loop, a body loop, and a back strap coupled at one end to the neck loop and coupled at an opposite end to the body loop, wherein the harness neck loop has left and right upper straps extending laterally from the harness back strap, and the harness body loop has left and right upper straps extending laterally from the harness back strap;
    a first set of fasteners, comprising (a) at least one fastener affixed to the neck loop upper left strap, (b) at least one fastener affixed to the neck loop upper right strap, (c) at least one fastener affixed to the body loop upper left strap, (d) at least one fastener affixed to the body loop upper right strap, and (e) at least one fastener affixed to the back strap of the harness;
    a garment, having left and right side edges, a top (outer) surface, and a bottom (under) surface, a front (proximal) end, a rear (distal) end, and a dorsal region; and
    a second set of one or more fasteners, the second set of fasteners being affixed to the under surface of the garment within the dorsal region;
    wherein the garment is releasably attached to the harness by placing the garment atop the harness and engaging the first set of fasteners with the second set of fasteners.

2. The combination animal harness and attachable garment of claim 1, wherein each of the first and second sets of fasteners is selected from the group consisting of snap fasteners, hook and loop fasteners, and magnetic fasteners.

3. The combination animal harness and attachable garment of claim 1, wherein either or both of the first and set of fasteners is a set of magnetic fasteners.

4. The combination animal harness and attachable garment of claim 1, wherein the garment is a cape having proximally directed left and right front panels.

5. The combination animal harness and attachable garment of claim 1, wherein the garment is a cape having a concave arc formed in the front end.

6. An animal harness and attachable garment, comprising:
    an animal harness comprising a neck loop formed of a plurality of narrow, neck loop straps joined together by hardware, a body loop formed of a plurality of narrow, body loop straps joined together by hardware, a back strap coupling the neck loop to the body loop, a chest strap coupling the neck loop to the body loop;
    a plurality of first fasteners, each fastener affixed to an outer surface of either a neck loop strap, a body loop strap, or the back strap;
    a garment having an outer surface and an under surface; and
    a plurality of second fasteners, affixed to the under surface of the garment;
    wherein the garment can be releasably mounted to the animal harness by mating each first fastener with a corresponding one of the second fasteners; and
    wherein the plurality of first fasteners includes at least one fastener affixed to a neck loop strap and at least one fastener affixed to the back strap.

7. The animal harness and attachable garment of claim 6, wherein the garment is a cape.

8. The animal harness and attachable garment of claim 6, wherein the first and second fasteners couple to each other magnetically.

9. The animal harness and attachable garment of claim 6, wherein the plurality of first fasteners includes at least two fasteners affixed to neck loop straps, at least two fasteners affixed to body loop straps, and at least one fastener affixed to the back strap.

* * * * *